United States Patent
Jennings

(10) Patent No.: US 9,981,194 B1
(45) Date of Patent: May 29, 2018

(54) MOTION BASE FOR RIDE ATTRACTION OR THEATER

(71) Applicant: Falcon's Treehouse, LLC, Orlando, FL (US)

(72) Inventor: Clifford A. Jennings, Orlando, FL (US)

(73) Assignee: Falcon's Treehouse LLC, Orlando, FL (US)

(*) Notice: Subject to any disclaimer, the term of this patent is extended or adjusted under 35 U.S.C. 154(b) by 0 days. days.

(21) Appl. No.: 15/639,718

(22) Filed: Jun. 30, 2017

(51) Int. Cl.
*A63G 31/16* (2006.01)
*A63J 25/00* (2009.01)
*A63G 31/02* (2006.01)
*G03B 21/56* (2006.01)

(52) U.S. Cl.
CPC ............. *A63G 31/02* (2013.01); *A63G 31/16* (2013.01); *A63J 25/00* (2013.01); *G03B 21/56* (2013.01)

(58) Field of Classification Search
CPC ........ A63G 31/00; A63G 31/02; A63G 31/04; A63G 31/16; A63J 5/00; A63J 5/12; A63J 25/00; A63J 2005/002
USPC ....... 472/59–61, 130, 136; 434/29, 55; 52/6, 52/7
See application file for complete search history.

(56) References Cited

U.S. PATENT DOCUMENTS

| | | | | |
|---|---|---|---|---|
| 5,702,307 A * | 12/1997 | Moran | ................... | A63G 31/16 472/130 |
| 5,759,107 A * | 6/1998 | Nagel | ................... | A63G 31/16 434/55 |
| 6,095,926 A * | 8/2000 | Hettema | ................ | A63G 31/16 104/85 |
| 8,206,230 B2 * | 6/2012 | Magpuri | ................... | E04H 3/22 434/55 |
| 2003/0125119 A1 * | 7/2003 | Jones | ...................... | A63F 13/08 472/60 |
| 2015/0065260 A1 * | 3/2015 | Beyr | ...................... | A63G 31/16 472/60 |

* cited by examiner

*Primary Examiner* — Kien Nguyen
(74) *Attorney, Agent, or Firm* — Perkins Coie LLP; Kenneth H. Ohriner

(57) ABSTRACT

In a theater or ride attraction, a motion base articulates a load-bearing seating platform by independently revolving two intermediate wedge-like rings to provide pitch, roll and yaw movements. Unlike flight simulator types of motion bases, these movements do not rely on substantially horizontally pivoting axes, and the resultant loads imparted to motive components. Rather the movements are provided by a circumferentially wedging action between the rings. The motion base has high load carrying capacity and reduced space requirements.

18 Claims, 6 Drawing Sheets

MOTION BASE FOR RIDE ATTRACTION OR THEATER

TECHNICAL FIELD

The invention relates generally to ride attractions and cinematic theaters.

BACKGROUND OF THE INVENTION

A novel theater, as described in U.S. Pat. No. 8,206,230, incorporated herein by reference, has seating for audience members on a circular platform on a motion base. The seating is surrounded by a curved screen. A projection system is oriented within the theater to project images on the screen. A control system can rotate, pitch and roll the motion base platform, with the motion base platform movements synchronized with the projected media presentation. The motion base may use a flight simulator type of motion base having linkages and linear actuators to achieve various movements. Although this design has been highly successful, an alternative type of motion base can provide advantages for certain applications.

SUMMARY OF THE INVENTION

In a theater moving images are displayed on a screen to an audience on a platform supported on a motion base. The motion base has a first angled ring supported on or attached to a first slew bearing. A second angled ring on top of and concentric with a first angled ring, is attached to or supported on the first angled ring by a second slew bearing. A third ring on top of and concentric with the second angled ring is attached to or supported on the second angled ring by a third slew bearing. The platform is supported on the third ring. A first motor is mechanically linked to the first slew bearing or the first angled ring for rotating the first angled ring about a central axis. A second motor is mechanically linked to the second slew bearing or to the second angled ring for rotating the second angled ring about the central axis. A third actuator is mechanically linked to the third slew bearing or the third ring for rotating the third ring about the central axis.

The motion base can provide pitch, roll and yaw movements, and it has a simplified and compact design in comparison to conventional motion bases. Other features and advantages will be apparent from the following detailed description.

BRIEF DESCRIPTION OF THE DRAWINGS

In the drawings, the same reference number indicates the same element in each of the views.

DETAILED DESCRIPTION OF THE DRAWINGS

Figure 1:
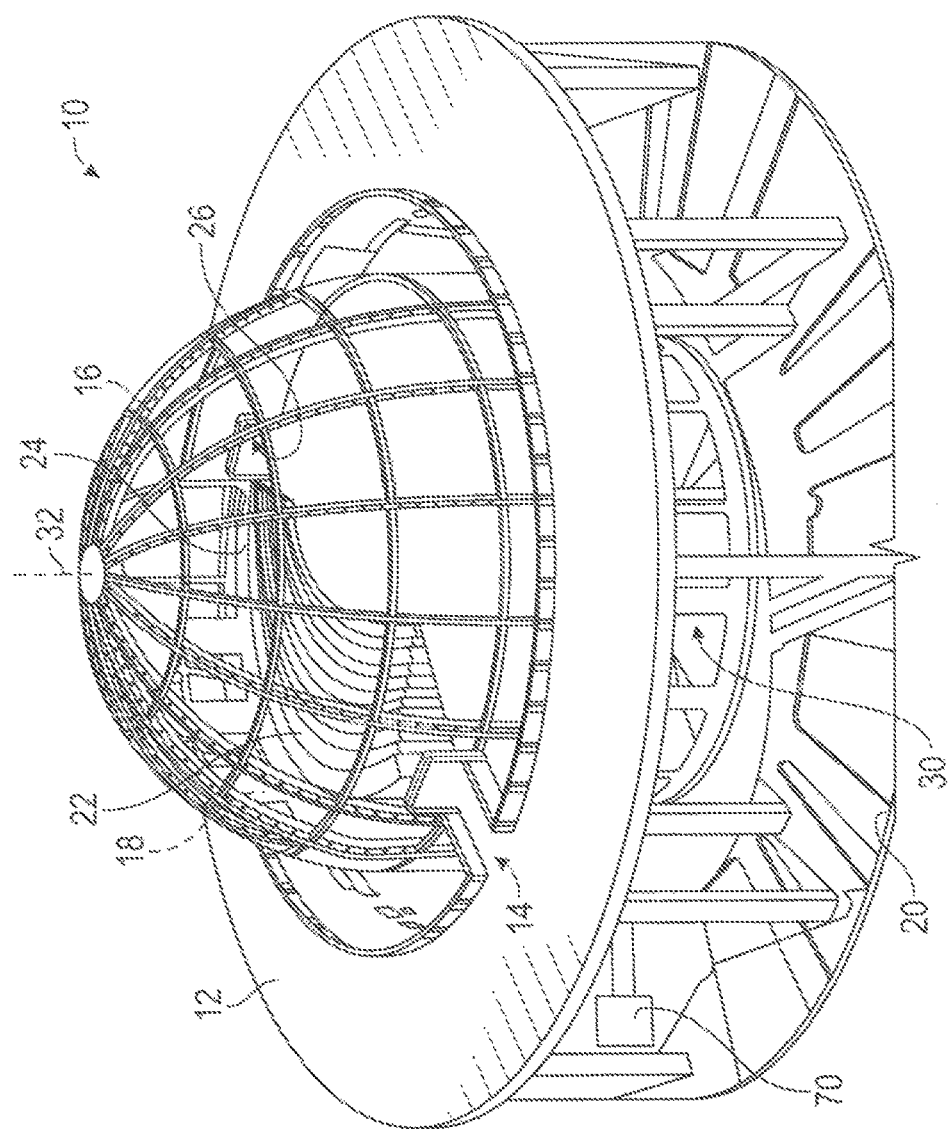
FIG. 1 is a schematic perspective view of a theater having a novel motion base in a level position.

In the example shown in FIG. 1, a theater 10 has an entry way 14 leading from a lobby platform 12 into a theater dome 16 having a screen 18 which curves in three dimensions, such as a hemispherical screen. A motion base 30 is supported on a sub-floor 20 below the lobby platform 12, with rows of seats 22 supported on the motion base 30. An exit way 26 may be provided out of the theater dome 16 opposite from the entry way 14. The theater 10 has projectors 24 for projecting moving images onto the screen 18. Alternatively, other techniques for providing moving images may be used, such as rear projection, active matrix screen, etc.

In most designs, as shown in FIG. 1, the theater dome 16 and the screen inside the theater dome 16 are fixed in place and do not move, with the theater dome 16 supported on the structure of the theater building, e.g., the lobby platform 12, the sub-floor 20 or other structure. In these embodiments the theater dome axis 32 is fixed in a vertical orientation, as shown in FIG. 1. In certain applications however, as shown in FIG. 2, the screen 18 and/or the theater dome 16 may be supported on the motion base 30, and the theater dome axis 32 may move off from vertical with movement of the motion base 30.

Figure 2:
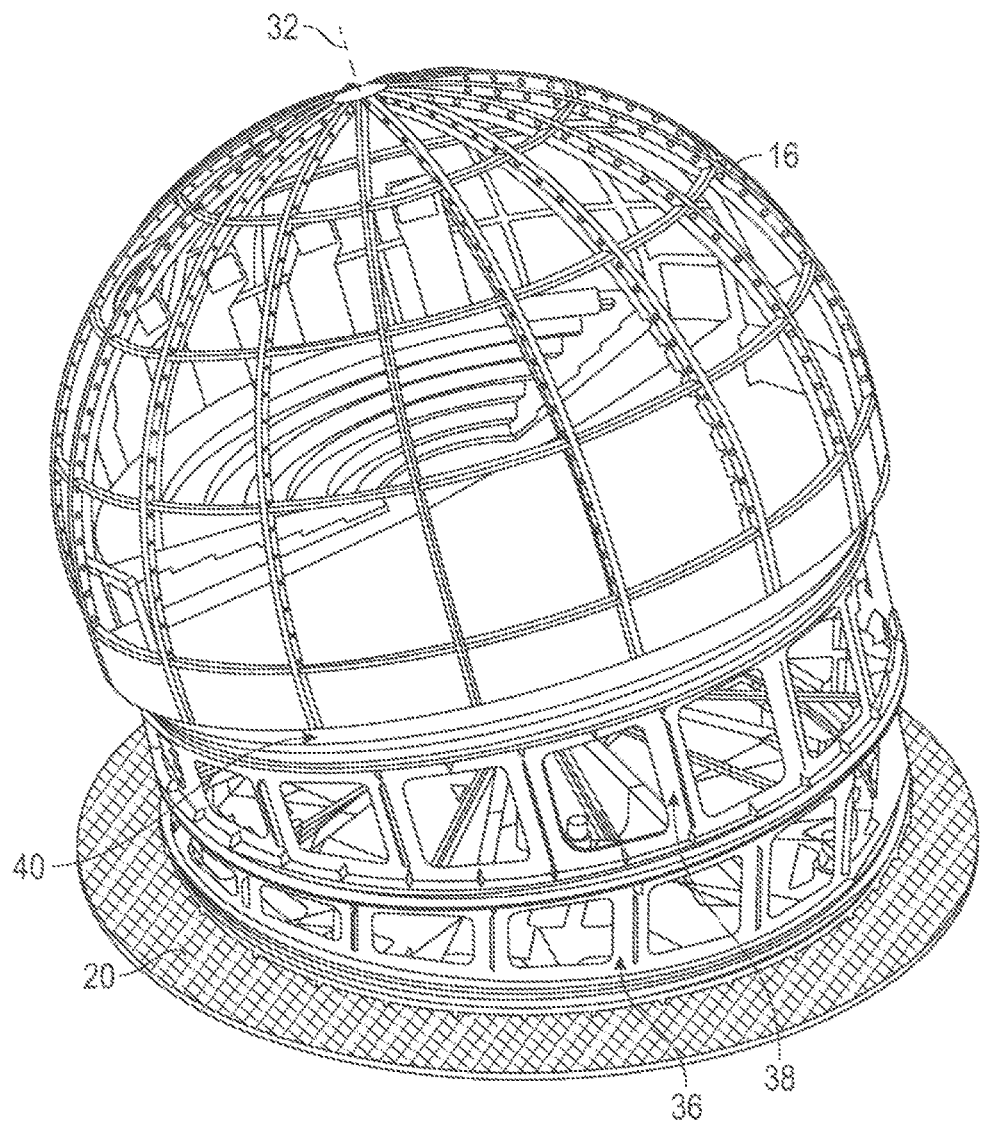
FIG. 2 is a schematic perspective view of a theater of FIG. 1 with the motion base in an angled position.
Figure 3:
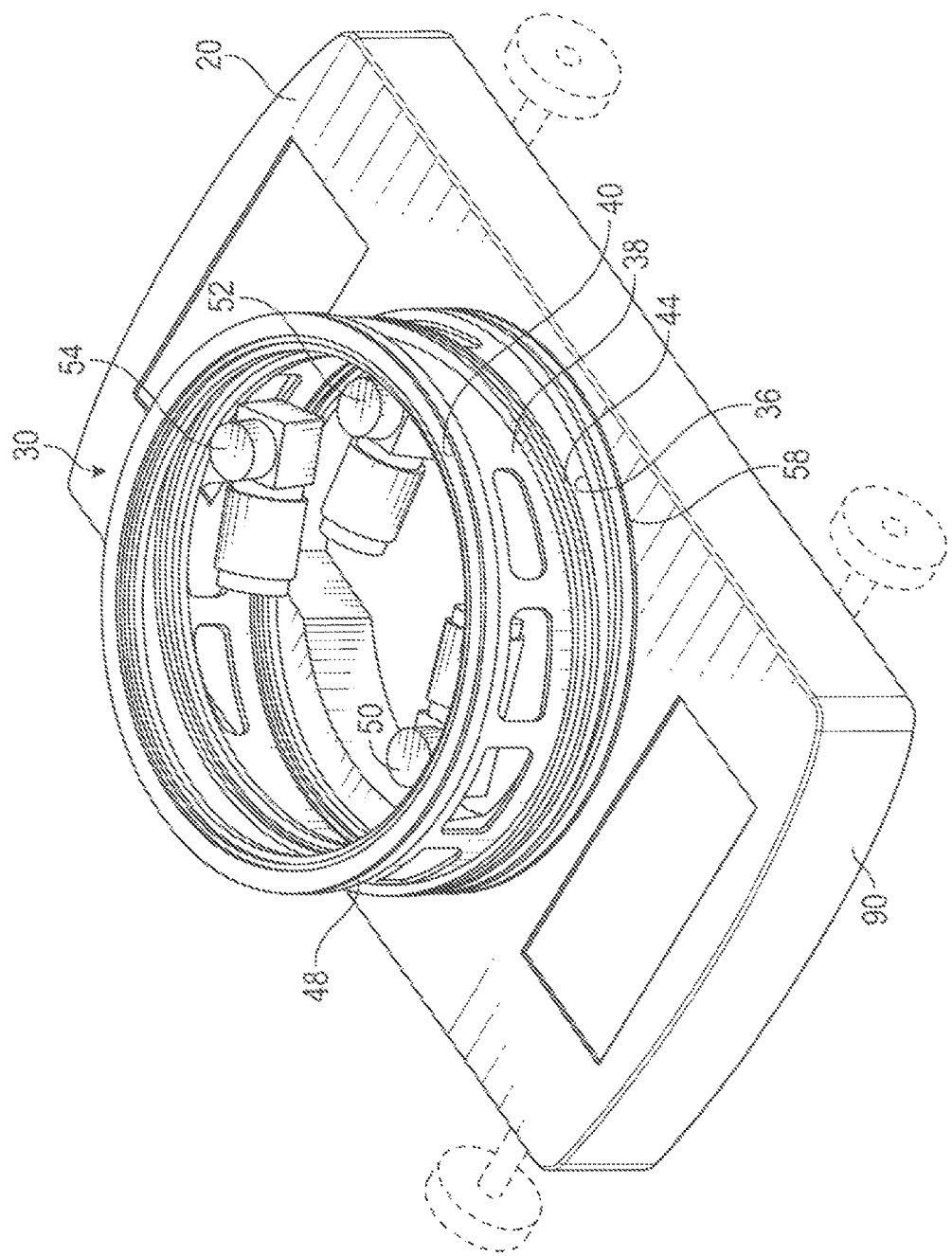
FIG. 3 is a schematic perspective diagram of the motion base shown in FIGS. 1 and 2, with the theater elements removed for purpose of illustration, and with the slew bearings aligned axially to place the motion base in the level position shown in FIG. 1.
Figure 4:
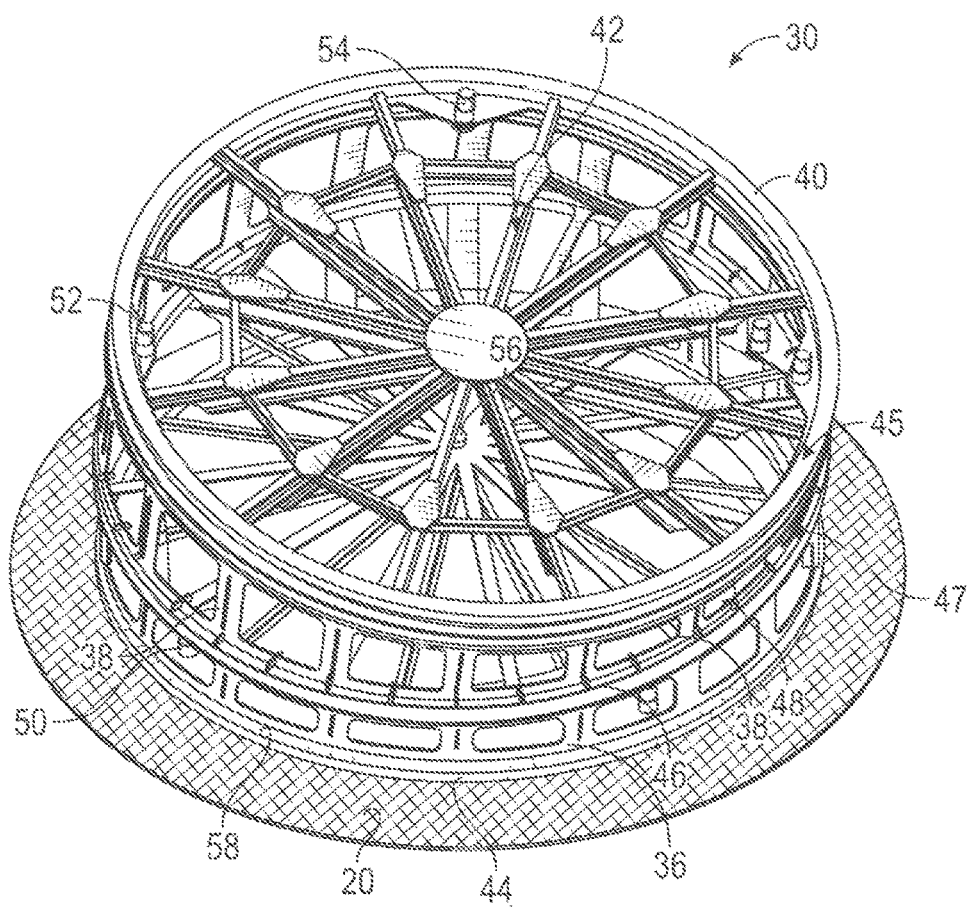
FIG. 4 is a top perspective view of the motion base of FIGS. 1-3 with the rings oriented for a maximum pitch or roll angle.
Figure 5:
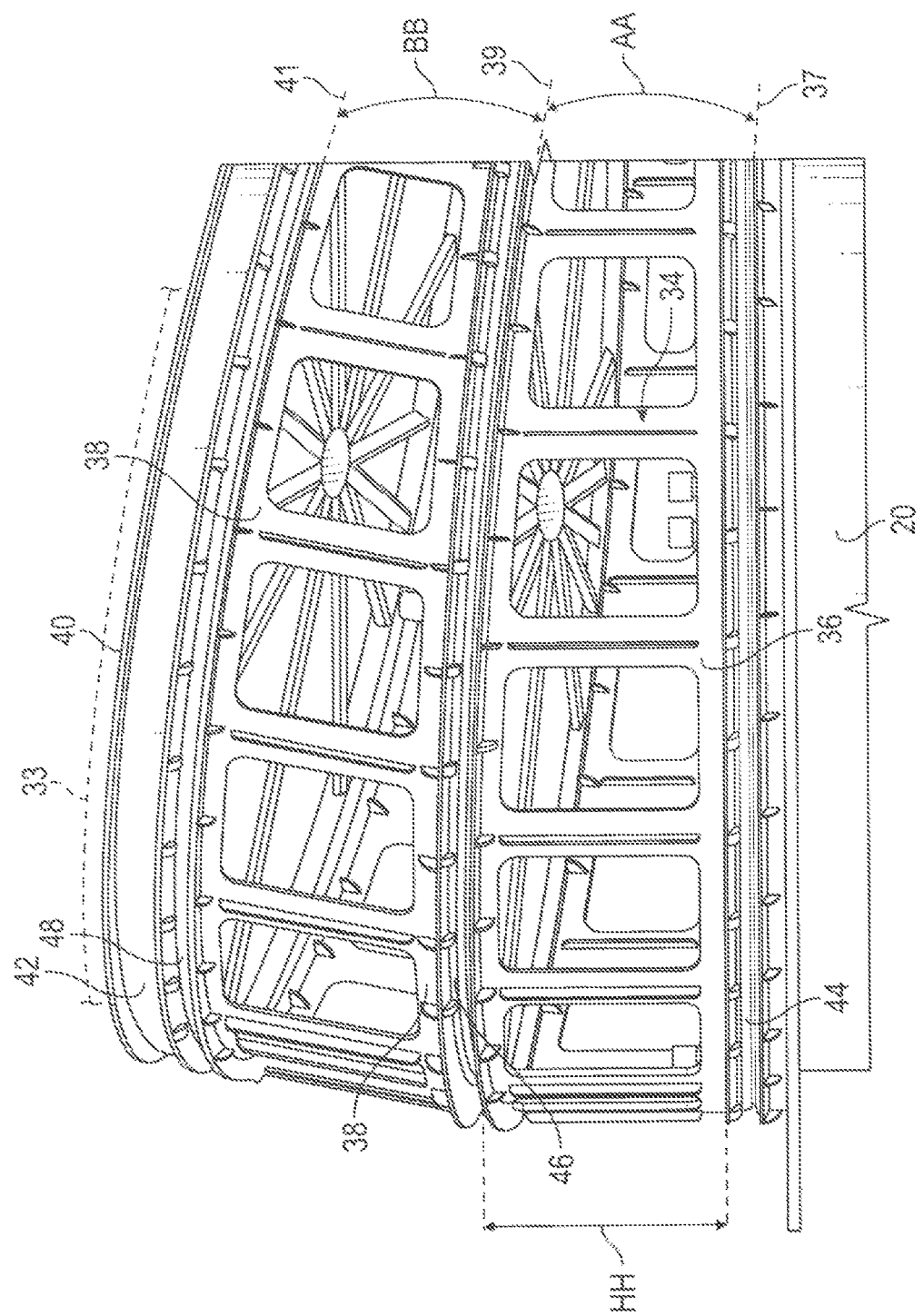
FIG. 5 is a side view of the motion base as it is shown in FIG. 4.

Referring now to FIGS. 2-6, the motion base 30 includes a first or lower ring 36 supported on a first slew bearing 44. As shown in FIG. 5, the first ring 36 is an angled ring, with the plane of the top surface 39 of the first ring 36 forming angle AA with the plane of the bottom surface 37 of the first ring 36. Angle AA typically ranges from about 5° to 30°, or 10° to 20°. The diameter and maximum height HH of the first ring may vary depending on the scale of the theater 10. For example, with a theater 10 having seating for 134 persons, the first ring 36 may have a diameter of 6 to 20 meters and a maximum height of 1 to 4 meters, or less in space-saving designs. The first ring 36 may be manufactured as a steel or aluminum weldment, with dimensions and wall thickness sufficient to carry the intended load of the audience members, seating 22 and motion base elements supported on the first ring 36. Also as shown in FIG. 2, the screen may be supported on the motion base so that the screen moves with the seating. Alternatively, the screen may be stationery and supported on the foundation.

The first ring 36 is supported on a first slew bearing 44 to allow the first ring 36 to rotate relative to the sub-floor 20 or other surface that the first ring 36 may rest on. The first slew bearing 44 may use rollers, ball bearings or similar elements, and have a bottom race attached to the sub-floor 20, with the bottom of the first ring 36 attached to a top race of the first slew bearing 44. The web section 34 of the first ring 36, between the top surface 39 and the bottom surface 37, may have through openings as shown in FIG. 2, or the web section 34 may be solid.

As shown in FIGS. 2-5, a second or middle ring 38 is rotatably attached on top of the first ring 36 via a second slew bearing 46. The second ring 38 is concentric with the first ring 36. The second ring 38 is an angled ring in the same sense as the first ring 36 discussed above. The plane of the top surface 41 of the second ring 38 forms an angle BB with the plane of the bottom surface of the second ring 38. Angle BB may be equal to angle AA. The description of the first ring 36 above applies as well to the second ring 38. The second ring 38 may be the same as the first ring 36 in size, shape and design features. Both rings 36 and 38 may have internal structural framework 42, as shown in FIG. 4.

The angles AA and BB are supplemental, i.e., the top surface 41 of the second ring 38 is horizontal (parallel to the sub-floor 20) when the low side of the second ring 38, generally indicated at 45 in FIG. 4, is aligned over the high side of the first ring 36, generally indicated at 47 in FIG. 4.

As best shown in FIGS. 3-6, a third or top ring 40 is rotatably attached on top of the second ring 38 via a third slew bearing 48. The third ring 40 is a flat ring and not an angled ring. The seating 22, optionally on an intermediate seating platform, is supported on the top ring 40. Of course, the seating 22 may be replaced with a standing platform, 33 typically with handrails or similar elements.

Figure 6:
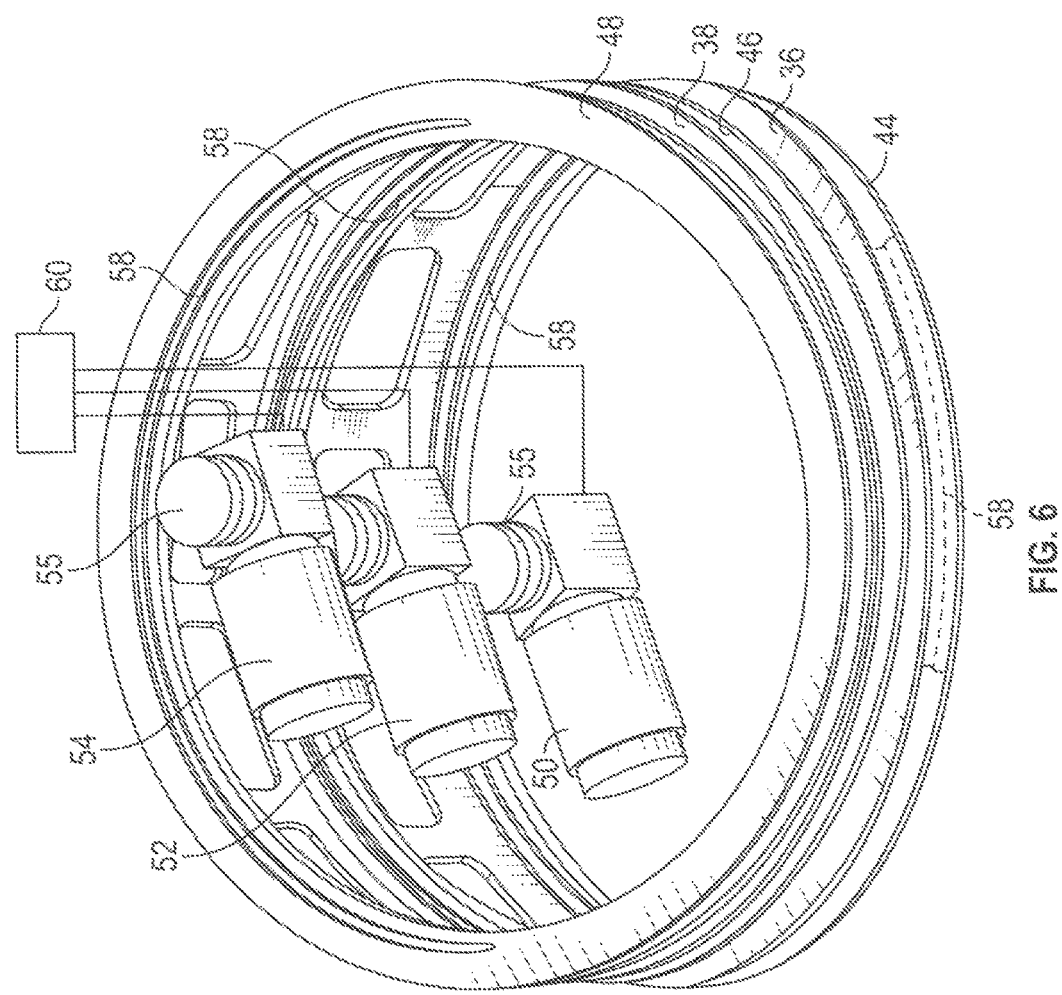
FIG. 6 is a top perspective view of an alternative motion base design.

Turning to FIGS. 3 and 6, a first actuator or motor 50 is positioned to rotate the first ring 36. The first motor 50 may be fixed in place on the sub-floor 20, with one or more gears or wheels engaging the upper race of the first slew bearing, to rotate the first ring 36. Alternatively, the first motor may be supported on the first ring 36. In this case, since the first motor 50 rotates with the first ring 36, electrical power is provided from a facility power supply 60 to the first motor via conductive rails 58 adjacent to, or built into, the first slew bearing 44, as shown in FIG. 3, or via slip rings 56 located at the theater axis 32, as shown in FIG. 4.

A second actuator or motor 52 is supported on, and rotates with, the second ring 38. The second motor 52 has one or more gears or wheels engaging the bottom race of the second slew bearing, so that actuation of the second motor 52 causes the second ring 38 to rotate relative to the first ring 36. A third actuator or motor 54 is supported on, and rotates with the third ring 40. The third motor 54 has one or more gears or wheels engaging the bottom race of the third slew bearing, so that actuation of the third motor 54 causes the third ring 40 to rotate relative to the second ring 38. Electrical power is separately supplied to the second motor 52 and to the third motor 54 using conductive rails 58 or slip rings 56 as described above. Electrical power supplied to each motor is independently controlled by the power supply 60 and/or the controller 70, so that the speed and direction of rotation of each ring can be independently selected. The motors may optionally engage the rings themselves, rather than the bottom races of the slew bearings.

As shown in FIG. 3, the mounting positions of the motors 50, 52 and 54 are offset or staggered, allowing the motion base 30 to be configured with a reduced total height, helping to reduce building height requirements. The motors may be mounted at the high side of the first ring and the second ring, to allow for a more compact design. FIG. 4 shows that the motors are positioned so that they pass over each other, to allow the rings to rotate without interference. The first motor 50 may be mounted on the sub-floor 20 or ground, or on the first ring 36. The second motor 52 may be mounted on the second ring 38 or on the first ring 36. The third motor 54 may be mounted on the third ring 40 or on the second ring 38. The position of each motor is arbitrary, so long as each motor can engage and drive its associated ring, and so long as the motor does not interfere with 360+degrees rotation of any of the rings. Each motor may be connected to a right-angle gearbox, with a tractive wheel acting upon a surface of the slew bearing associated with that motor.

In the example of FIG. 6, the rings are oriented to align the three motors vertically. There is sufficient vertical clearance between them to allow the motors to pass over or under each other. Also in FIG. 6, a drive wheel 55 of each motor is mounted to rotate in the same plane as the slew bearing being driven. The axis of the drive wheel 55 of the first motor 50 is perpendicular to the sub-floor 20 and the first slew bearing 44. The axis of the drive wheel 55 of the second motor 52 is perpendicular to the second slew bearing 46.

In use, audience members enter the theater dome and sit in the seats 22 or stand on the platform 33. An electronic controller 70 initiates display of moving images on the screen 18, typically along with a sound track. The controller 70 also controls the power supply 60 to operate the motion base 30 to move the seats 22 or platform 33 in synchronization with the displayed moving images. The motion base 30 provides yaw movement via the third motor 54 rotating the third ring 40, which carries the seats 22. The motion base provides pitch and roll movements via the first and second motors rotating the first and second rings. Pitch and roll movements may be achieved without yaw movement by rotating the first and third rings in a first direction, e.g., clockwise, while simultaneously rotating the second ring in the opposite direction, i.e., counterclockwise.

The designs shown in FIGS. 1-6 may be inverted for use in a theater where the seating is suspended from a motion base, i.e., where the first slew bearing 44 is attached to the ceiling of theater building rather than to a floor or sub-floor. In this case, the seating 22 is suspended below the third ring 40.

The designs shown in FIGS. 1-6 may also be used in a ride attraction, where the motion base 30 is mounted on a vehicle. In this application, the sub-floor 20 is replaced with the chassis 90 of a vehicle, as shown in dotted lines in FIG. 3, with the vehicle movable along a track or pathway. The vehicle may alternatively be suspended from an overhead track. In these applications, movements similar to those provided by flight simulator types of motion bases may be provided, but with the motion base 30 requiring less space and with a more simple design.

Thus, novel apparatus and methods have been shown and described. Various changes and substitutions may of course be made without departing from the spirit and scope of the invention. The invention, therefore, should not be limited, except by the following claims and their equivalents.

The invention claimed is:
1. A theater comprising:
   a screen for displaying moving images;
   a platform supported on a motion base, including:
   a first angled ring attached to a first slew bearing;
   a second angled ring on top of and concentric with the first angled ring, with the second angled ring attached to the first angled ring by a second slew bearing;
   a third ring on top of and concentric with the second angled ring, with the third ring attached to the second angled ring by a third slew bearing, and with the platform supported on the third ring;
   a first motor mechanically linked to the first slew bearing or to the first angled ring for rotating the first angled ring about a central axis;
   a second motor mechanically linked to the second slew bearing or to the second angled ring for rotating the second angled ring about the central axis; and
   a third motor mechanically linked to the third slew bearing or to the third ring for rotating the third ring about the central axis.
2. The theater of claim 1 with the first, second and third rings having equal diameters.
3. The theater of claim 1 with the first angled ring having a first angle and the second angled ring having a second angle equal to the first angle.

4. The theater of claim 1 wherein the screen is fixed in place on a foundation and the platform is rotatable and movable into pitch and roll angle positions by operation of the motors.

5. The theater of claim 4 with the first motor having a drive wheel engaging the first angled ring.

6. The theater of claim 5 with the second motor supported on the first angled ring or on the second angled ring, and further including a first electrically conductive rail for providing electrical power from an electrical source on the foundation to the second motor while allowing the first angled ring to rotate relative to the foundation; and
  a second electrically conductive rail for providing electrical power from the first angled ring to the third ring while allowing the second angled ring to rotate relative to the first angled ring.

7. The theater of claim 1 further including a controller electrically connected to the first, second and third motors for independently controlling speed and direction of rotation of the first, second and third rings, respectively.

8. The theater of claim 1 with the first motor on a foundation, and with the first slew bearing having a lower race on the foundation, and the first motor engaged with an upper race of the first slew bearing, for rotating the first angled ring.

9. The theater of claim 1 further comprising seats on the platform, with the seats facing the central axis, and with the seats at least partially surrounded by the screen.

10. A theater comprising:
  a screen for displaying moving images;
  a first ring rotatably supported on a foundation;
  a first motor positioned to rotate the first ring relative to the foundation;
  a second ring on top of and concentric with the first ring, with the second ring rotatable relative to the first ring, and with the first ring having a first angle and the second ring having a second angle;
  a second motor positioned to rotate the second ring relative to the first ring;
  a third ring on top of and concentric with the second ring, with the third ring rotatable relative to the second ring;
  a platform supported on the third ring, and seats on the platform facing the screen;
  a third motor positioned to rotate the third ring relative to the second ring; and
  an electronic controller electrically connected to the first, second and third motors for independently controlling speed and direction of each motor.

11. The theater of claim 10 wherein the third ring is flat, and the seating platform is rigidly attached to the third ring.

12. The theater of claim 10 wherein the first angle ranges from 10 to 30 degrees.

13. The theater of claim 10 wherein the first angle is equal to the second angle.

14. The theater of claim 10 with the first ring supported on the foundation via a first slew bearing and the second ring is attached to the first ring via a second slew bearing.

15. The theater of claim 10 with the first motor on the first ring and the second motor on the second ring, further including a first set of rotational electrical contactors providing first electrical connections from an electrical source on the foundation to the first motor on the first ring, and a second set of rotational electrical contactors providing electrical connections between the first ring and the second motor on the second ring.

16. The theater of claim 10 with the screen comprising a dome supported directly or indirectly, and fixed in place relative to, the foundation.

17. The theater of claim 10 wherein the first, second and third motors are vertically aligned when the seating platform is in a level orientation.

18. The theater of claim 10 with operation of the third motor providing yaw movement to the seating platform, and with operation of the first and second motors providing pitch and roll movement to the seating platform.

* * * * *